United States Patent [19]
Siri

[11] Patent Number: 6,009,000
[45] Date of Patent: Dec. 28, 1999

[54] SHARED-BUS CURRENT SHARING PARALLEL CONNECTED CURRENT-MODE DC TO DC CONVERTERS

[75] Inventor: Kasemsan Siri, Torrance, Calif.

[73] Assignee: The Aerospace Corporation, El Segundo, Calif.

[21] Appl. No.: 09/245,824

[22] Filed: Feb. 5, 1999

[51] Int. Cl.⁶ .................................................. H02M 3/335
[52] U.S. Cl. ............................................. 363/21; 363/65
[58] Field of Search .................................. 363/20, 21, 65, 363/71, 95, 97, 131

[56] References Cited

U.S. PATENT DOCUMENTS

| | | | |
|---|---|---|---|
| 5,157,269 | 10/1992 | Jordan et al. ............................ | 307/59 |
| 5,164,890 | 11/1992 | Nakagawa et al. ....................... | 363/65 |
| 5,321,600 | 6/1994 | Fierheller ................................. | 363/65 |
| 5,724,237 | 3/1998 | Hunter .................................... | 363/65 |

*Primary Examiner*—Matthew Nguyen
*Attorney, Agent, or Firm*—Derrick Michael Reid

[57] ABSTRACT

A power system consisting of parallel connected current-mode power converters combined with a voltage error signal on a shared-bus used in common for controlling all of the power stages for improved consistency, reliability, and performance in both transient and steady states. Near uniform current sharing is achievable without sacrificing the voltage regulation performance. The improved system offers faster settling time under step loads, consistent small signal characteristics and large signal responses regardless of mismatches of components values such as reference voltages, and reduced output impedance variations in magnitude and phase even during various modes of operation.

20 Claims, 5 Drawing Sheets

MINIMUM VOLTAGE-ERROR SHARED-BUS
CURRENT-MODE POWER STAGE

SHARED-BUS PARALLEL-CONNECTED
CURRENT-MODE POWER SYSTEM

FIG. 1

MINIMUM VOLTAGE-ERROR SHARED-BUS PARALLELED
CURRENT-MODE POWER SYSTEM

FIG. 2

MINIMUM VOLTAGE-ERROR SHARED-BUS
CURRENT-MODE POWER STAGE

FIG. 3

MAXIMUM VOLTAGE-ERROR SHARED-BUS PARALLELED
CURRENT-MODE POWER SYSTEM

FIG. 4

MAXIMUM VOLTAGE-ERROR SHARED-BUS
CURRENT-MODE POWER STAGE

FIG. 5

SHARED-BUS CURRENT SHARING PARALLEL CONNECTED CURRENT-MODE DC TO DC CONVERTERS

STATEMENT OF GOVERNMENT INTEREST

The invention was made with Government support under contract No. F04701-93-C-0094 by the Department of the Air Force. The Government has certain rights in the invention.

FIELD OF THE INVENTION

The invention relates to the field of DC to DC power converters. More particularly, the present invention is related to shared-bus control connections to parallel connected DC to DC power converters providing uniform and stable current sharing performance.

BACKGROUND OF THE INVENTION

Power systems may have several parallel connected converters having their respective single control loops operating in either voltage regulation or current limiting mode. Performance limitations have been discovered through system simulations. Non-uniform current sharing occurs despite voltage droop characteristics that facilitate near-uniform current-distribution. Due to random mismatches in component values, uneven current sharing among parallel connected converters exists. This causes system performance characteristics to exhibit large variations and system current sharing is found to be far from uniform, resulting in poor system performance and reliability.

Each power stage may include a DC to DC converter and a respective control circuit. Multiple current mode DC to DC converters may be connected in parallel to meet increased current demands of a load. With increased current demand, additional converters can be added as needed. When connecting multiple current mode converters to a common load, a significant problem is the unequal delivery of current by all of the converters. Each converter should operate independently yet contribute an equal amount of current to the load in the presence of different voltage references and component values.

A parallel connected DC to DC converter system may use a random current sharing approach in which many basic power converter stages are connected in parallel. It is desirable that many power systems of the same design have consistent steady state and transient responses as well as small signal characteristics of the paralleled converter system under resistive load conditions over dynamic operating conditions. Different systems have varying performance limitations such as inconsistent current limiting and sharing performance, poor voltage regulation, and poor output impedance characteristics. These systems have undesirable current sharing control as a primary cause of the performance limitations. These performance limitations lead to low reliability of power components under uneven current stresses, poor output transient responses, and large variances in output impedance. Various current sharing approaches have been developed to solve these disadvantages. These current sharing approaches are intended for uses in classes of power converters that usually do not exploit current-mode controls as the inner-most basic control loop. Current-mode controlled converters become desirable when using simple current sharing control. Non-current-mode controlled paralleled converter systems also have many limitations including non-uniform current sharing, large variances in system output impedance, degraded output voltage regulation, and inferior transient output performance.

The parallel connected converter system with random current sharing may include several power stages, for example, twelve power stages, connected in parallel at respective inputs and outputs. Each power stage consists of a converter with an associated power switch driving circuit and a control circuit. The control circuit produces a rectangular pulse width modulated signal driving power switching devices in the converter through the power switch driving circuit. When each power stage is operated as a stand-alone converter, the output voltage and current are fed back to the control circuit to regulate either the converter output voltage or the output current. Depending on load conditions, only a single feedback control loop is operating at any time in either voltage regulation or current limiting mode. As an example, each power stage is a single-ended step-up forward converter and boosts the input DC voltage, e.g. 28V +/−2V, to an output voltage, e.g., 123V +/−2 V with a nominal output power up to 210 W.

In this exemplar case, a converter power stage has voltage regulation and a current limiting control loop. Each power stage has two control modes of operation. The first mode is voltage regulation and the second mode is current limiting. In the output voltage regulation mode, the output voltage is regulated and stabilized to 123V +/−2 V with linear droop characteristics from 125V to 121V corresponding to the load condition from zero to 1.75 A. When the load current is just above its nominal level, e.g. 1.75 A, the power stage operation starts shifting to a current limiting mode in which the output voltage begins to decrease below 121V with a moderate regulation error. When the load demands more current, the current limiting operation becomes fully active by regulating the load current about 10% above its nominal value with 1.96 A set as the output short-circuit current.

Different power stages are not likely to be the same. The power stages will operate in different modes with some of the power stages operating in the voltage regulation mode and others in the current limiting mode, primarily because of differing component values and independent reference voltages. Additionally, some of the power stages operating in voltage regulation mode may operate in the continuous conduction mode while other power stages operate in the discontinuous conduction mode. Power stages operate in the discontinuous conduction mode when the output current drops below 0.33 A. When a converter power stage operates in the discontinuous conduction mode, the converter power stage exhibits different large and small signal characteristics as compared to those obtained from the same converter operating in the continuous conduction mode. Hence, a conventional continuous conduction mode power stage model may not be suitable for design verification through simulation of light load or mismatched conditions that may have some power stages operating in the discontinuous conduction mode while other power stages operate in the continuous conduction mode. A high-fidelity large signal model of the power stage can be developed to determine the mode of operation in the discontinuous conduction mode or continuous conduction mode for both large and small signal analyses. Under variations of load and component tolerances, this large signal model allows more accurate and realistic performance simulations of dynamic operations as a function of output impedances, loop gain frequency responses of the converters operating in voltage regulation or current limiting mode, and step load responses.

For simplicity of discussion, the model of paralleled converter system may be partitioned into two groups of paralleled power stages. In the model, an ideal voltage source supplies power to all the converters that transfer most of the power through an output cable to a resistive load. When N power stages are operating identically in either voltage regulation or current limiting mode, a lumped model of N paralleled power stages is used to share the same feedback control circuit. The large signal model of N paralleled power stages is simply derived from the basic power stage by proper scaling of power component values, that is, power inductance scaled by 1/N, filter capacitance scaled by N, and parasitic series switching loss scaled by 1/N. The remainder of the power stages operating identically but in a different mode from the former group will be likewise scaled by the total number of converter minus N instead of N. Electronic circuit computer simulations can be performed to evaluate the basic transient and dynamic performance, that is, the stability of the voltage regulation and the current limiting loop gains, the output impedance, and the step load and fault transient responses. The converter system model includes several power stages operating in either voltage regulation or current limit mode depending on the load condition and the reference voltage. The two groups of power stages are set to be either identical or within 1% mismatch of their reference voltages. Despite the reference voltage mismatches, all twelve power stages operate in the voltage regulation mode under a 1 A load or other light to moderate load conditions. The simulation results may reveal many limitations of the converter system in both the current sharing performance and other dynamic performance characteristics, such as output impedance, voltage regulation, and current limiting loop gains.

From system to system, the paralleled power stages exhibit an inconsistent current sharing and current limiting performance. Small signal characteristics of current limiting loop gain reveal significant variations in unity gain frequencies under different load conditions. The current limiting responses obtained from non-identical power stages and control circuit due to slight component mismatches are compared to one another. These sets of responses show significant differences in terms of control bandwidths and imbalances in the currents distributed among the power stages in both transient and steady state values of the current limiting level. Due to the randomness in current sharing, the transient response during step loads can cause one or more power stages to always exceed or reach current limiting operation while the remainder never experience such stresses. Consequently, utilization time distributed among the paralleled power stages is far from uniform, and the system reliability is degraded. The power stages that suffer from high output current transient stresses will degrade at a faster rate than those not experiencing excessive stresses.

The power stages exhibit low DC gain and a slow voltage regulation loop response. To help achieve steady state near-uniform current sharing among the power stages, the voltage regulation control loops for respective power stages must provide at least near identical droop characteristics. The DC gain of the voltage regulation loop is then limited to a moderate value, e.g., less than 30 dB, to facilitate non-stiff characteristics of the output voltage. Consequently, the bandwidth of the control loop is restricted to low frequencies due to basic roll-off characteristics of the output filter in each power stage. The low control bandwidth also results in a slow transient performance as compared to that of a single converter system in which the voltage loop gain bandwidth can be extended due to the absence of current sharing complications.

The paralleled power stages exhibit a significant variation of the output impedance. There are many combinations of operational modes caused by random mismatches among the twelve power stages. As system to system performance inconsistency is apparent, the output impedance characteristics of such converter systems of the same design can be far different even at the same line and load condition. Significant variations of output impedance characteristics are realized when operating the power stages in various modes, including voltage regulation, current limiting, discontinuous conduction and continuous conduction modes. Under existing control approaches, there is no sure way to control the mismatches in component values for the reduction of the output impedance variances. This can result in an overlap between the system output and load impedances and contribute to a high risk of oscillation on output voltage and current sharing among power stages.

The random current sharing without shared-bus arrangement have several disadvantages. Non-uniform current sharing is due to mismatches in component values leading to different modes of operation existing among paralleled converters. The output voltage regulation performance, both in steady state and transient condition, is degraded to compromise with tolerable current sharing that is not always near-uniform. Large variations in output impedance is due to slight circuit and control mismatches among paralleled converters, leading to inconsistent output impedance characteristics from system to system. Inconsistent current sharing performance is realized from system to system due to inconsistent mismatches in component values and/or reference voltages within paralleled converters. Undesirable interactions among parallel connected converters lead to complicated stability designs due to different modes of operation among paralleled converters, each of which is controlled differently under respective dedicated voltage regulation control loops. The lack of an accessible common control port prohibits uniform control to the paralleled converters to meet other control objectives such as system over-voltage protection.

A shared-bus arrangement has been disclosed in U.S. Pat. No. 5,157,269 in which the shared-bus is formed by wired-OR ideal rectifiers with a pull down resistor to a ground reference. The wired-OR ideal rectifiers provide a mean to output the maximum sensed current signal selected from all sensed current signals being proportional to the respective currents through the respective converters. The rectifiers have to be ideal because the signals being sensed must be proportional to the actual power stage currents. Zero voltage drop across the rectifiers is required to gain accuracy of the shared-bus signal that is used as a master current reference signal for uniform current sharing control of the slave converters. In this approach, the output currents of the slave converters are less than the output currents of the master converters. The master converters are not controlled in the same direction as are the slave converters. This sharedbus approach is for controlling the parallel connected converters that do not necessarily have current-mode operation in the inner most control loops. The approach serves as a mean to produce different reference voltages to which the output voltages of the respective converters are individually regulated as a way to equalize the output currents of the converters. Each converter has a respective voltage regulation feedback control path that generates different control signal strength and/or direction compared to the other converters. Due to many feedback paths of voltage regulation control loops having different reference voltages, conflicts are created in voltage regulation control. During any transient due to step load or step line conditions, the master and slave operation can be exchanged many times because the output current of a master converter is dependent on the output currents of the slave converters by sharing the same output load circuit. This dependency introduces oscillation of current sharing during transients, resulting in indefinite exchanges in master and slave operations. These and other disadvantages are solved or reduced using the present invention.

SUMMARY OF THE INVENTION

An object of the invention is to provide uniform current distribution, stiff regulation of the system output voltage, and reduced output impedance variances of a power supply system.

Another object of the invention is to provide current-mode controlled converters in a power system using a shared-bus providing a common error signal to the converters all equally controlled for supplying an equal contribution of a load current supplied to a load.

The present invention employs current-mode control through a peak current approach using a shared-bus connected to a plurality of individual DC to DC converters. In this peak current approach, each converter power stage operates as a voltage-controlled current source as a current-mode power stage. A voltage regulation control circuit is modified to select the error voltage generated from the control loop that has the smallest reference voltage or as desired the highest reference voltage. This error voltage is then used as a common commanding control signal communicated through the shared-bus for all current-mode power stages. This shared-bus configuration offers near-uniform current sharing. Additionally, the DC or low frequency gain of the voltage regulation control loop can be made much higher to provide a stiff regulated DC output voltage without degrading current sharing performance. This control scheme regulates the output voltages of all paralleled converters to the same voltage corresponding to the smallest reference voltage or if desired, the highest reference voltage, within the converter system. The shared-bus is used to achieve near-uniform current distribution, small variances in the system output impedance, highly regulated system output voltage, and fast transient output performance.

The power system is for supplying power to load. The system comprises a plurality of parallel connected current-mode power stages that share the common control signal from respective shared-bus control ports. Each of the plurality of current-mode power stages is for converting an input voltage to a regulated output voltage coupled to the load. Each of the plurality of current-mode power stages comprises a DC to DC converter and a control circuit wherein the converter is for receiving the input voltage and providing the output voltage and the control circuit is for controlling the converter and for providing the common control signal referred to as a shared-bus. All shared-buses of the current-mode power stages are tied together forming a shared-bus control line. The control circuit in each current-mode power stage fundamentally includes current-mode control in the innermost feedback loop to constitute a current-mode converter power stage that operates as a voltage-controlled current-source. With two or more similar current-mode power stages connected in parallel at respective inputs and outputs, the output currents can be controlled in tandem by the common controlling voltage on the shared-bus to provide near-identical output current distribution despite mismatches in component values without an additional complex current sharing control. Each DC to DC converter is capable of operating as a stand-alone unit in which the shared-bus would be left externally unconnected. Otherwise, all of the shared-buses are tied together in the parallel connected configuration.

As preferred in this invention, each current-mode power stage has peak-current control in an innermost control loop. The innermost control loop for each current-mode power stage can be extended to any current-sensing control scheme that regulates a switch-mode DC to DC converter as a voltage-controlled current source. Such innermost current control may sense current through the converter power stage switching devices or that through the main energy processing inductor within the converter, or that through either the converter output hot or return terminal, or that through either the converter input hot or return terminal. Control of a current-mode converter can have either peak-current control with or without ramp compensation, or can have average-current control. The peak-current control is a means to regulate the peak current through switching devices or peak energy through a main switched inductor within the converter. Average-current control regulates the average current through converter input, or that through converter output, or that through the main switched inductor within the converter. Those current-mode DC to DC converters that are connected in parallel are usually of the same converter topology. A DC to DC converter topology that can be controlled as a current source can be a conventional buck, a conventional buck-boost, a conventional boost, or any of their derivatives, or a resonant converter. Such converters are controlled in a switch-mode fashion under either a fixed or variable switching frequency. The preferred converter is a switching converter using a conventional transformer. The control circuit can be also used to control different kinds of converters such as buck converters, boost converters, and fly back converters, so long as these converters have a switching means for receiving the input voltage and conducting current in a first state and not conducting current in a second state for providing a switched power signal switching between the first and second states with the switching means receiving a switching signal from the control circuit for converting the switched power signal into the output voltage.

The control circuit in each current-mode power stage further comprises an output voltage regulation control circuit as an outer feedback control loop, that provides a commanding input voltage to the innermost current-mode control loop. Output voltage regulation in a stand-alone current-mode power stage is accomplished by a control voltage signal generated from a voltage error amplifier that detects the difference between the target regulated voltage and the actual output voltage to provide an error voltage. For two or more converters connected in parallel, respective error voltages can be different due to a mismatch in respective reference voltages or control component values. The voltage regulation control circuit is further modified to select the error voltage generated from the voltage regulation control loop that has a dominant error voltage that may be either the smallest, or highest error voltage generated among all of the converters. This dominant error voltage is then used as a common commanding control signal on a shared-bus connected to all of current-mode power stages. This control scheme regulates the output voltages of all parallel connected converters to the same voltage corresponding to the smallest or highest reference voltage within the converter system.

The control circuit in each current-mode power stage, as an option, may further include an output current limiting control circuit as another outer feedback control loop, that provides a commanding input voltage to the innermost current-mode control loop when the output current of the respective power stage exceeds a current reference set-point corresponding to an over power rating condition of the converter power stage. The optional current limiting control for each power stage is independent and does not interfere with current limiting or voltage regulation of other current-mode power stages that are connected in parallel together.

The invention uses a shared-bus configuration by using wired-OR passive rectifiers with a pull down resistor to the control circuit reference voltage. Ideal rectifiers are not required because the signal being rectified is the dominant error voltage generated by a respective error amplifier that has very high gain. A non-zero voltage drop in the rectifier that detects the dominant error signal does not affect the current sharing performance nor deteriorate the output voltage regulation because the feedback control loop has a very high loop gain that effectively reduces the voltage regulation error to a negligible error.

The shared-bus signal is used as a common commanding signal to all of the parallel connected current-mode converters. The magnitude of the commanding signal is automatically adjusted by the outer feedback control loop such as the system output voltage regulation control loop. Because the paralleled current-mode converters are almost identical, the output currents are nearly uniform as a result of being controlled in tandem by a common commanding signal. All of the converters are controlled in the same direction to have the system output voltage regulated to the same value corresponding to the highest or alternatively the smallest, voltage reference. The uniform converter control eliminates the control conflicts generated by mismatches in reference voltages within individual converters because only one feedback path for the voltage regulation control loop is controlled by the wired-OR shared-bus. Oscillations in current sharing do not exist because all the converter output currents are controlled in the same direction by the same shared-bus signal.

The invention has several advantages. The invention offers simplicity in design implementation to achieve stable system performance in current sharing, and output voltage regulation with consistent transient operation. Adverse interaction among paralleled converters is minimized because all of the converters are controlled uniformly in tandem thereby eliminating transient oscillations in current sharing among converter output currents. The invention allows for the controlling the paralleled converters in tandem to meet specific control objectives through the shared-bus control line. Reliable and consistent performance of near-uniform output current sharing and output impedance characteristics enabling consistent producibility from system to system because the converter control method is not sensitive to mismatches in component values existing in the paralleled converters. The paralleled converters are operated in the same mode of operation thereby ensuring near-uniform current sharing. These and other advantages will become more apparent from the following detailed description of the preferred embodiment. dr

DETAILED DESCRIPTION OF THE PREFERRED EMBODIMENTS

Figure 1:
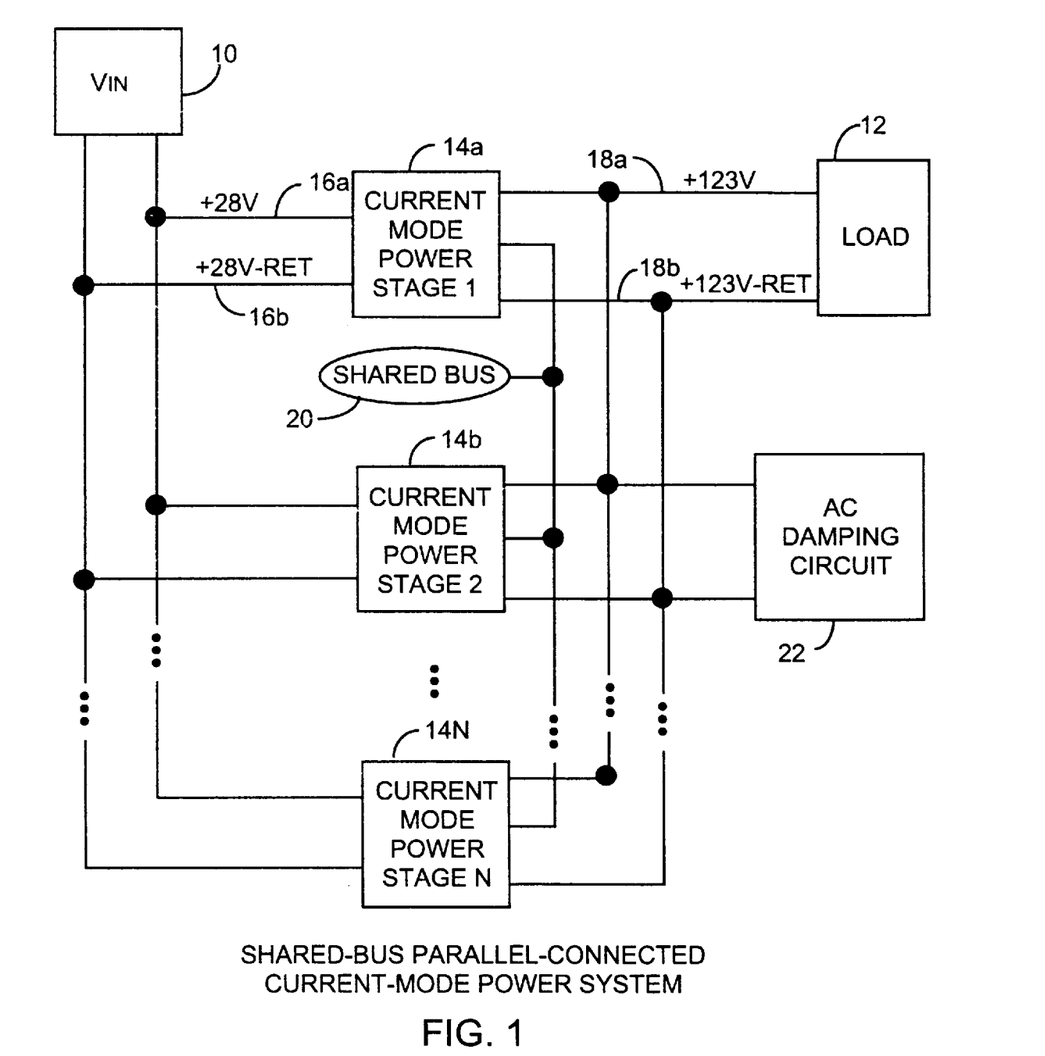
FIG. 1 is a schematic of a shared-bus parallel connected current-mode power system having N current mode power stages.

An embodiment of the invention is described with reference to the figures using reference designations as shown in the figures. Referring to FIG. 1, a shared-bus parallel connected current-mode power system is shown connecting an input voltage 10 to a load 12 through a plurality of N parallel connected current-mode power stages 14a through 14n, respectively. The power system is used to convert input voltage Vin on lines 16a and 16b to an output voltage on lines 18a and 18b. By way of example, the input voltage Vin is nominally 28V and the output voltage is nominally 123V. Also connected to the parallel power stages 14a–n is the shared-bus 20 forming a common control line for regulating all the current-mode power stages 14a–n in tandem.

Figure 2:
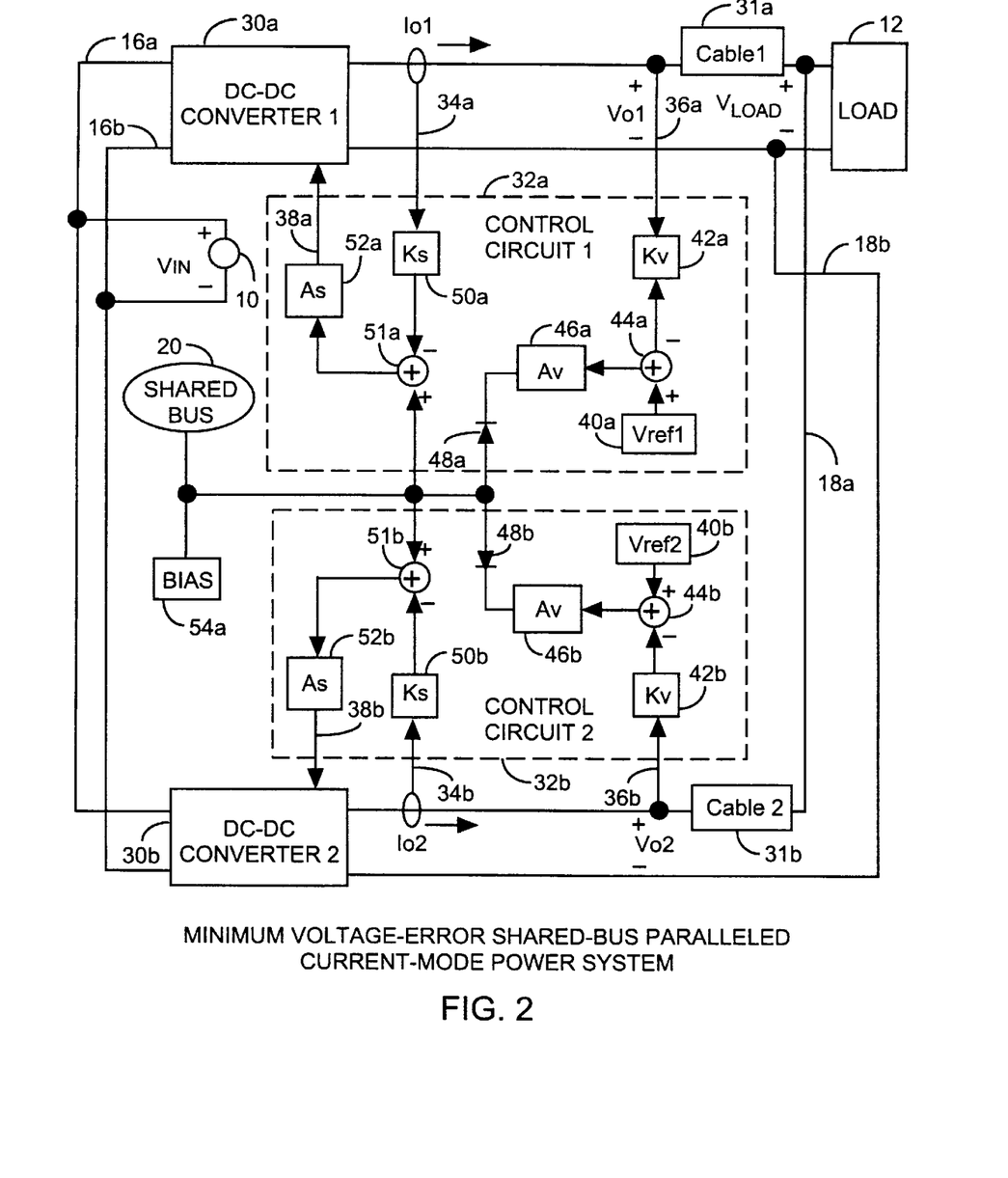
FIG. 2 is a schematic of a minimum voltage error shared-bus parallel connected current-mode power system.
Figure 4:
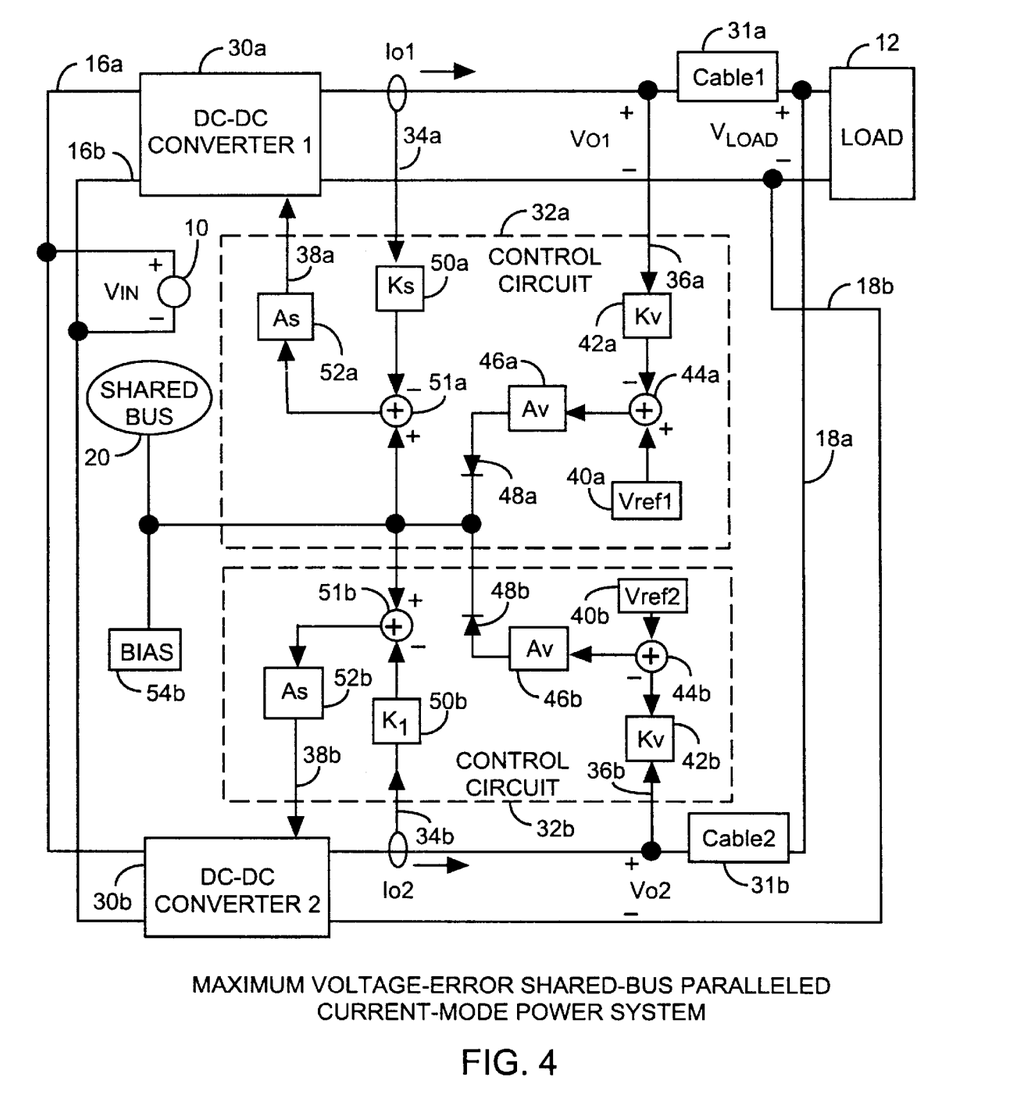
FIG. 4 is a schematic of a maximum voltage error shared-bus parallel connected current-mode power system.

Referring to FIGS. 1, 2 and 4, and more particularly to FIGS. 2 and 4, general interconnected circuit blocks are shown for respective general minimum and maximum error voltage operation. Each of the power stages 14a–n includes a respective power converter and feedback control circuit, such as converters 30a and 30b and control circuits 32a and 32b. The converters 30a and 30b can be, in general, step-up or step-down buck, boost, or flyback type converters. In the preferred form, and for simplicity of description, forward or buck-derived converters are used to demonstrate the current sharing control employing the shared-bus 20. As the power system is expanded by adding more current-mode power stages, a system AC damping circuit 22 may be required to ensure sufficient stability. The damping circuit 22 usually comprises one or more capacitive-coupling damping resistors that absorb excess AC energy to better stabilize the system response. The input voltage source 10 Vin supplies electrical power over lines 16ab to a plurality of DC to DC converters, for example two converters 30a and 30b providing power through respective first and second cables 31a and 31b, respectively, to the common load 12. Converters 30a and 30B are respectively controlled by control circuits 32a and 32b. Each of the power stages 14a and 14b respectively comprises a converter and control circuit pair, 30a and 32a, and 30b and 32b. Converter output currents Io1 and Io2 are sensed on lines 34a and 34b, respectively, and converter output voltages Vo1 and Vo2 are provided on lines 36a and 36b, respectively as inputs to the respective control circuits 32a and 32b providing respective switching signals 38a and 38b to the respectively connected converters 30a and 30b.

The control circuits 30a and 30b comprise respective reference voltages Vref1 40a and Vref2 40b, voltage scalars Kv 42a and 42b, output summers 44a and 44b, voltage amplifiers Av 46a and 46b, shared-bus diodes 48a and 48b, power stage sensed current signal scalars Ks 50a and 50b, and switching signal amplifiers as 52a and 52b, respectively. The shared-bus diodes 48a and 48b are connected to the shared-bus 20 connected in turn to bias circuits 54a or 54b depending on the orientation configuration of the diodes 48a and 48b. In FIG. 2, the anodes of diodes 48a and 48b are connected to the shared-bus 20 connected to bias 54a, and in FIG. 4, the cathodes of diodes 48a and 48b are connected to the shared-bus 20 connected to bias 54b, for providing respective minimum or maximum voltage error current sharing control operation.

Figure 3:
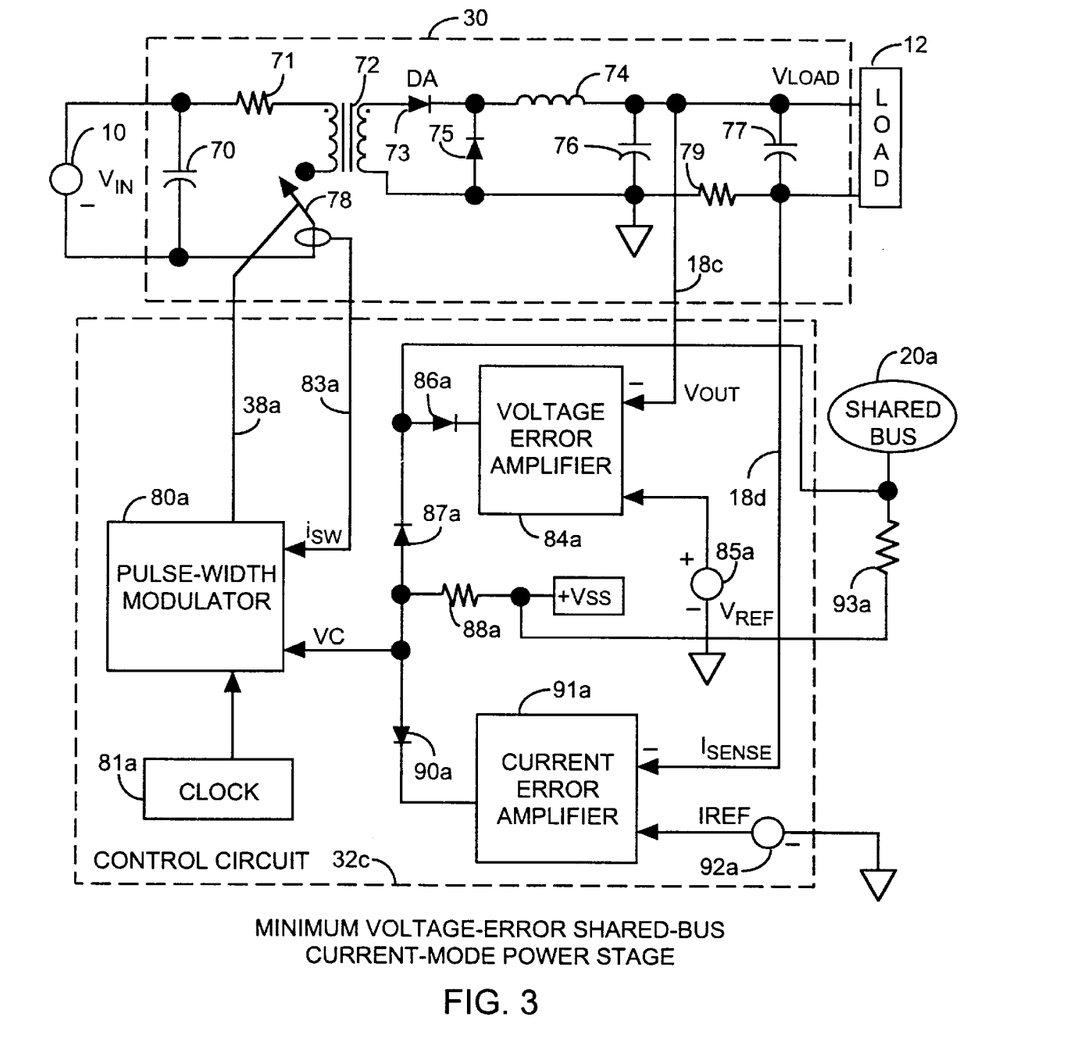
FIG. 3 is a detailed schematic of a minimum voltage error shared-bus parallel connected current-mode power stage.
Figure 5:
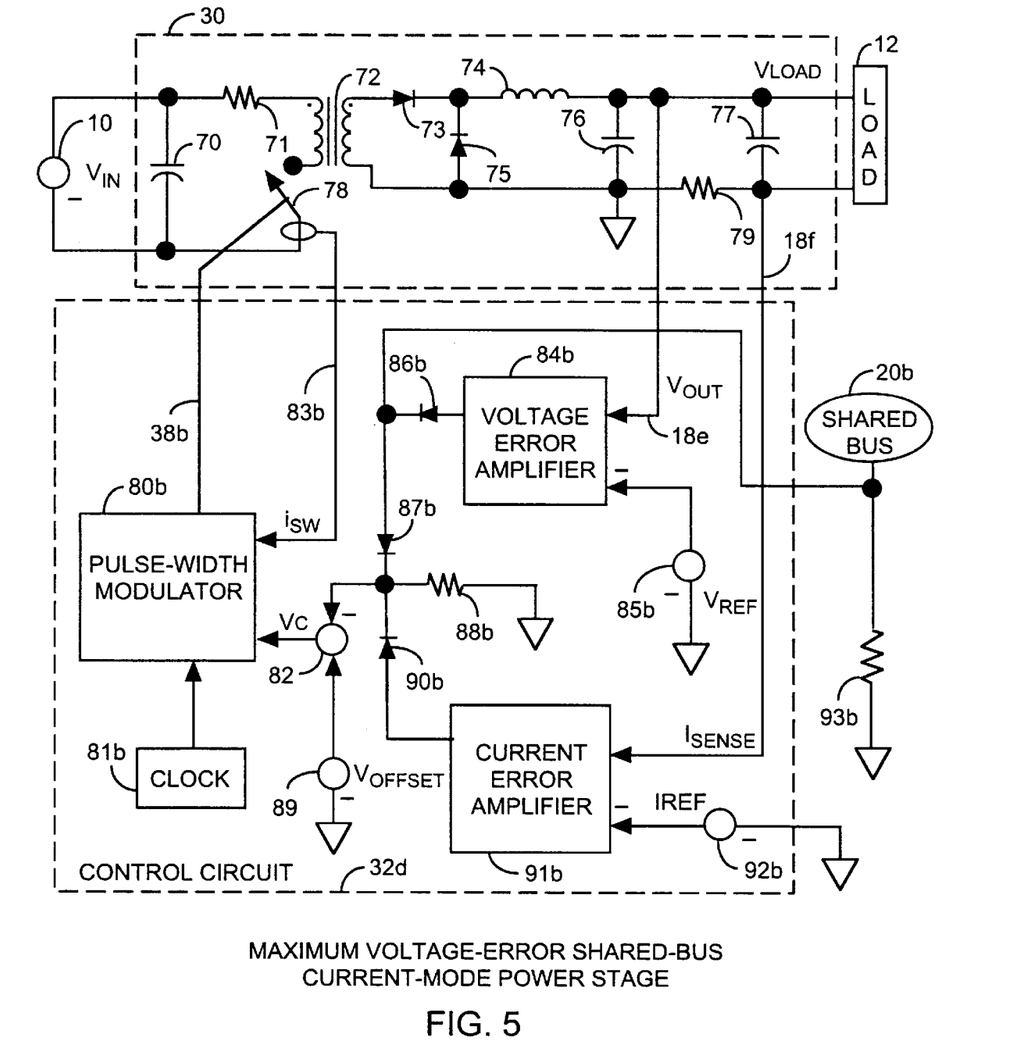
FIG. 5 is a detailed schematic of a maximum voltage error shared-bus parallel connected current-mode power stage.

Referring to all of the Figures, and particularly to FIGS. 3 and 5, specific interconnecting circuits are shown for specific minimum and maximum error voltage operation for single converter 30 and a respective control circuit 32c or 32d receiving two feedback voltage signals 18c and 18d or 18e and 18f, respectively. Each power converter 30 receives power transferred from the input voltage source 10 communicated to an input capacitor 70, input resistor 71, and a switching transformer 72 for providing a switching voltage communicated to a rectifier circuit comprising diode 73, inductor 74, diode 75 and capacitor 76 providing in turn a rectified and filtered output voltage Vout on line 18c or 18e. A switch 78 is connected to the primary winding of the transformer 72 for providing a switching voltage at the secondary winding of the transformer 72 for providing a switching voltage to the rectifier circuit 73, 74, 75 and 76. The output voltage Vout across the output capacitor 76 is connected across a sense resistor 79 and an output capacitor 77 across which is connected a load voltage signal Vload applied across the load 12. The sensing resistor 79 is used to sense the load current Io to the load 12 and for providing a current sensing signal on line 18d or 18f. Hence, each control circuit 32c or 32d receives an output voltage signal 18c or 18e and an output current sensing signal 18d or 18f, respectively.

Each of the control circuits 32c and 32d comprise a pulse width modulator 80a and 80b each receiving a timing clock signal respectively from clocks 81a and 81b. Each pulse width modulator 80a or 80b receives a control voltage signal Vc, and a switching current signal 83a or 83b being proportional to the switching current flowing through the respective switch 78, while providing a respective switching current signal 83a or 83b. The voltage control signal Vc of control circuit 32d is generated by a control summer 82, whereas the voltage control signal Vc of control circuit 32c is not. Each control circuit 32c and 32d further comprises a voltage error amplifier 84a and 84b respectively receiving the output voltage signal 18c and 18e that is compared to a Vref reference voltage signal from a respective voltage reference 85a and 85b. The voltage error amplifiers 84a and 84b provide a respective voltage error signal through voltage error diodes 86a and 86b providing a respective shared-bus signal 20a and 20b. The voltage error amplifiers 84a and 84b typically have their own internal feedback paths from respective outputs to respective inverting inputs. Alternatively, feedback paths can be rerouted from respective shared-buses 20a and 20b to respective inverting inputs. These feedback paths comprise a combination of passive components interconnected together. The respective shared-bus signals 20a and 20b are also connected through blocking diodes 87a and 87b respectively to pull up resistor 88a and pull down resistor 88b used for generating the voltage control signal Vc as the controlling input to the pulse width modulators 80a and 80b. The pull up resistor 88a is pulled up to voltage reference Vss whereas the pull down 88b is pulled down to the ground reference. In control circuit 32c, the voltage control signal Vc is provided directly from the pull up resistor 88a whereas in control circuit 32d the voltage control signal Vc is provided by the summer 82 of which the negative and positive inputs are connected to the pull down resistor 88b and an offset voltage reference 89, respectively. The pull up resistor 88a, in FIG. 3, providing the voltage control signal is connected to diode 87a and current error diode 90a that is in turn connected to a current error amplifier 91a receiving the sensed current signal 18d and a current reference voltage 92a, whereas, in FIG. 5, the pull down resistor 88b is connected to the summer 82, the diode 87b and a current error diode 90b that is in turn connected to a current error amplifier 91b receiving the current signal 18f and a current reference voltage 92b. Further, in control circuit 32c the shared-bus signal 20a is connected to pull up resistor 93a, whereas, in control circuit 32d, the shared-bus signal 20b is connected to pull down resistor 93b. The two control circuits 32c and 32d operate in substantially the same manner excepting for the respective minimum and maximum error signal operation. As shown, diodes 86a, 87a and 90a are in a reversed configuration as compared to respective diodes 86b, 87b and 90b, and the amplifier +/− inputs 18c and 85a, and, 18d and 92a are in a reversed polarity as compared to amplifier +/− inputs 18e and 85b, and 18f and 92b.

In the current-mode power stages 14a–n shown in FIG. 1, the shared-buses 20ab shown in FIGS. 3 and 5 are interconnected through voltage error diodes 86ab connected to the output of the voltage error amplifier 84ab and to the shared-bus 20ab. When the shared-bus 20ab is connected externally to all of the other shared-buses 20ab, an external error voltage signal is created and used in common to all of the power stages 14a–n. In FIG. 3, the diode 86a provides reverse bias high impedance state to block sourcing current from the output of the error voltage amplifier 84a when the external error signal is less than the locally generated voltage error signal. As shown in FIG. 5, the diode 86b provides a reverse bias high impedance state to block sinking current into the output of the error voltage amplifier 84b when the external error signal is greater than the locally generated voltage error signal. Current limiting is activated when the power transferred from a converter 30 exceeds a power rating. Thus, the reversed-bias diode 87ab suppresses the voltage regulation control within an over powered converter while allowing the external error signal of one of the other power stages 14a–n to take over and dominate the voltage regulation control of the control circuit 32 and hence the respective current-mode power stages 14a–n that are operating within power ratings. The diodes 90ab and current error amplifiers 91ab can be eliminated when the converter current limiting function is not included. When the control circuit 32cd is designed to have output current limiting function, the current error amplifier 91ab will provide a dominating current error signal under overload conditions to provide forward bias to diodes 90ab and to reverse-bias to diodes 87ab. In this manner, the output current limiting for each power stage 14a–n is independent and does not interfere with current limiting or voltage regulation of other power stages 14a–n when the shared-bus 20 is tied to shared-buses of all of the other parallel connected power stages 14a–n. Each of the pull up and pull down resistors 88ab provides a path for sufficient current to forward bias either diodes 87ab or the diodes 90ab to remain in a relatively low impedance state as compared to the driving source impedance of the voltage regulation amplifiers 84ab or the current limiting amplifiers 91ab. The current-mode pulse-width modulator 80ab are typically designed to increase converter power output when the control voltage Vc swings positive within the respective control circuits 32cd. In control circuit 32d, the control voltage Vc generated by the dominating error voltage obtained either from the voltage error amplifier 84b or a current limiting control amplifier 91b. In control circuit 32c, the control voltage Vc is the difference between a positive offset voltage bias 89 and the dominating error voltage obtained either from the voltage error amplifier 84b or a current limiting control amplifier 91b. Alternative configurations may be used in which the error amplifiers 84ab and 91ab have the opposite gain and polarity. In these alternative configurations with several power stages 14a–n connected in parallel, the output voltage is regulated corresponding to either the highest voltage reference as shown in FIG. 4 or the smallest voltage reference as shown in FIGS. 2, 3, and 5.

When a minimum voltage error signal is used in control circuit 32c, the output voltage 18c is connected to the negative input of amplifier 84a and the voltage reference 85a is connected to the positive input of amplifier 84a. Similarly, the current sense signal 18d is connected to the negative input of amplifier 91a and the current reference 92a is connected to the positive input of amplifier 91a. When a maximum voltage error signal is used in control circuit 32d, the output voltage 18e is connected to the positive input of amplifier 84b and the voltage reference 85a is connected to the negative input of amplifier 84b. Similarly, the current sense signal 18f is connected to the positive input of amplifier 91b and the current reference 92b is connected to the negative input of amplifier 91b.

The output voltage under many parallel connected power stages is regulated by the least or greatest error signal from the amplifiers 84a or 84b, amplifiers 91a or 91b or the shared-bus 20a or 20b, respectively. The control voltage Vc within one converter is independent from the control voltage Vc within another converter and under the voltage regulation control mode these control voltages Vc are about the same with some negligible mismatch depending on component tolerances within diodes 86ab and 87ab that are statistically random in nature. The current-mode control is implemented as an innermost control loop that causes the converter power stage 14a–n to operate as a voltage-controlled current source. When several current-mode power stages 14a–n are connected in parallel and the same controlling external error signal is shared in common through the shared-bus 20ab, the converters 30ab can deliver near uniform output currents to the shared load 12 because of almost identical control voltages Vc. The controlling error voltage of the shared-bus 20ab to all current-mode power stages 14a–n is created by wired-ORed connecting all the shared-bus outputs 20ab together. This shared-bus external control error signal is shared in common on the shared-bus. Among all of the voltage error amplifiers 84ab in all converter control circuits 32cd, only one voltage error amplifier 84ab generating the least or greatest error signal onto the shared-bus 20ab, respectively, will control all the current-mode power stages operating in voltage regulation mode. Despite mismatches in reference voltages and component values, all of the current-mode power stages 14a–n will be almost identically controlled to deliver respective near uniform output currents to the load 12, and, as a consequence, the respective output voltages are also regulated to the same level.

Simulations have verified the improvement of small signal characteristics, steady state responses, and transient large signal responses under exemplar operating conditions. The voltage regulation loop-gain of the parallel connected converter system was characterized for 1 A and 20 A loads. The unity gain bandwidth at 1 A was made much higher at 1.47 kHz with improved phase margin at 53.8 degrees. Similarly, the unity gain bandwidth at 20 A was 3.25 kHz with 76.0 degrees of phase margin. Loop gain at low frequencies is higher and greater than 65 dB, revealing a much stiffer regulated output voltage. Between 30 Hz and 10 KHz, impedance magnitudes for both load conditions have less difference than the non-current-mode topology. Below 30 Hz and above 10 kHz, both output impedances are almost the same despite operational differences between discontinuous conduction mode and the continuous conduction mode. The steady state output current responses for two groups of six converters were simulated and shown to be uniform despite mismatches in their reference voltages at 4.72V versus 4.9V, at both 1 A and 20 A thereby confirming the effectiveness of the shared-bus. In an extreme case, one converter was assigned to have a voltage regulation reference 4% higher than the reference voltages of the remaining eleven converters. The steady state output current of this converter was about the same as those of the remaining converters with only a slight reference voltage mismatch of less than 2%. In addition, the steady state output voltage of the converter system with the shared-bus has improved load regulation, without significant voltage droop characteristics such as between 120.5V and 125.6V from 1 A to 20 A under random current sharing, resulting in a stiff regulated output voltage similar to that obtained from a very low impedance voltage source. The step load transient performance for both output voltage regulation and output current sharing is improved. The settling time for step loading from 20 A to 1 A is less than 2 mSec. The output voltage transient overshoot and undershoot are less than 5% of the operating voltage. The output voltage transient time is reduced to be within 1% of its operating level to be within 1.5 mSec. Despite mismatches in reference voltages assigned between two groups of six converters, output current sharing between the two converter groups remains uniform even during transients. Under 20 A pre-load and a 1-Ohm step fault transition, the system simulation revealed a time domain response of the output and of the total power stage inductor currents of power converters in the first group of six parallel connected current-mode converters. These inductor currents were the same as those obtained from the second group of six parallel connected current-mode converters because the current limiting control circuits within all converters were identical. A 56 A peak output current of the first group is due to a 1.07 Ohm total fault load of an output capacitor voltage of 120V at the fault transition. The first group total inductor current was stepped down from 10 A to zero rapidly indicating very fast current limiting control that ensures the current stresses in power switching devices would be reduced to zero while the output capacitors are still supplying a greater portion of the fault current in the first 500 uSec.

The present invention is characterized by a shared-bus controlled by a power stage having either the least or greatest voltage error signal. The invention is preferably used in a plurality of parallel connected power stages within a power supply system in which a requisite number of power stages are activated depending on the load current requirements. Those skilled in the art can make enhancements, improvements and modifications to enhance the invention. However, those enhancements, improvements and modifications may nonetheless fall within the spirit and scope of the following claims.

What is claimed is:

1. A power stage for converting an input voltage to an output voltage, the power stage comprising a converter and a control circuit wherein the converter is for receiving the input voltage and providing the output voltage and the control circuit is for controlling the converter, the converter comprises:

a switching means for receiving the input voltage and conducting current in a first state and not conducting current in a second state for providing a switched power signal switching between the first and second states; and a switch means for receiving a switching signal and for converting the switched power signal into the output voltage and for generating a switched current signal, and the control circuit comprises:
- a voltage error amplifier for providing a voltage error signal scaled to the difference between the output voltage and a voltage reference;
- a voltage error diode for communicating the voltage error signal onto a shared-bus control line, the shared-bus control line is for receiving an external error signal, the voltage error diode is for translating the voltage error signal into a voltage control signal for controlling the switching signal, the voltage control signal is controlled by the voltage error signal or controlled by the external error signal; and
- a driver means for receiving the voltage control signal and receiving the switched current signal for generating the switching signal for alternating driving the switch means being in the first and second states for switching the switching means.

2. The power stage of claim 1, wherein the voltage control signal is controlled by the voltage error signal when greater than the external error signal or controlled by the external error signal when greater than the voltage error signal.

3. The power stage of claim 1, wherein the voltage control signal is controlled by the voltage error signal when lesser than the external error signal or controlled by the external error signal when lesser than the voltage error signal.

4. The power stage of claim 1 wherein,
the converter is a DC to DC switching current mode converter,
the input voltage is a DC input voltage,
the output voltage is a DC output voltage,
the switching signal is a pulse width modulated switching signal,
the output voltage is regulated by the pulse width modulated switching signal, and
the switch means is also for rectifying the switched power signal into the DC output voltage.

5. A power stage for converting an input voltage to an output voltage, the power stage comprising a converter and a control circuit wherein the converter is for receiving the input voltage and providing the output voltage and the control circuit is for controlling the converter, the converter comprises:
- a transformer having a primary winding for receiving the input voltage and conducting current in a first state and for not conducting current in a second state, and having a secondary winding for providing a switched power signal;
- a switch for receiving a transformer switching signal and for switching the primary of the transformer between the first and second states for transforming the input voltage signal into the switched power signal;
- a current sensor for sensing the current through the primary winding and providing a switched current signal; and
- a rectifier circuit for rectifying the switched power signal into the output signal, and the control circuit comprises:
- a voltage error amplifier for providing a voltage error signal scaled to the difference between the output voltage and a voltage reference;
- a voltage error diode for communicating the voltage error signal onto a shared-bus control line, the shared-bus control line is for receiving an external error signal, the voltage error diode is for translating the voltage error signal into a voltage control signal for controlling the transformer switching signal, the voltage control signal is controlled by the voltage error signal or controlled by the external error signal, and
- a driver for receiving the voltage control signal and switched current signal for generating the transformer switching signal for alternating driving the switch being in the first and second states for switching the primary of the transformer to generate the switched power signal.

6. The power stage of claim 5 wherein, the voltage control signal is controlled by the voltage error signal when greater than the external error signal or controlled by the external error signal when greater than the voltage error signal.

7. The power stage of claim 5 wherein, the voltage control signal is controlled by the voltage error signal when lesser than the external error signal or controlled by the external error signal when lesser than the voltage error signal.

8. The power stage of claim 5 wherein,
the converter is a DC to DC switching current-mode converter,
the input voltage is a DC voltage,
the output voltage is a DC voltage,
the transformer switching signal is a pulse width modulated switching signal,
the output voltage is regulated by the pulse width modulated switching signal, and
the rectifier comprises a rectification diode and an output capacitor for generating and filtering the DC output voltage.

9. The power stage of claim 5 wherein the converter provides a current sense signal, the control circuit further comprising,
- a current error amplifier for providing a current error signal scaled to the difference between the current sense signal and a current reference;
- a current error diode for communicating the current error signal onto the voltage control line, the current error diode is for translating the current error signal into the voltage control signal for controlling the transformer switching signal, the voltage control signal is controlled by the voltage error signal, the current error signal or the external error signal.

10. The power stage of claim 9 wherein the voltage control signal is controlled by the voltage error signal, the current error signal or the external error signal, whichever is greater.

11. The power stage of claim 9 wherein the voltage control signal is controlled by the voltage error signal, the current error signal or the external error signal, which ever is lesser.

12. The power stage of claim 5 wherein,
the converter further comprises:
- a current sensing resistor for providing a current sense signal indicating current conducted to a load coupled to the output voltage; and
- a current sensor for providing a current switching signal, and the control circuit further comprising:
- a current error amplifier for providing a current error signal scaled to the difference between the current sense signal and a current reference; and a current error diode for communicating the current error signal onto the voltage control line, the current error diode is for translating the current error signal into the voltage control signal for controlling the transformer switching signal, the voltage control signal is controlled by the voltage error signal, the external error signal or the current error signal.

13. The power stage of claim 5 wherein the converter provides a current sense signal, the control circuit further comprising,
- a current error amplifier for providing a current error signal scaled to the difference between the current sense signal and a current reference;
- a current error diode for communicating the current error signal onto the voltage control line, the current error diode is for translating the current error signal into the voltage control signal for controlling the transformer switching signal, the voltage control signal is controlled by the voltage error signal, the current error signal or the external error signal, and
- a blocking diode for blocking the voltage error signal and the external error signal from the control voltage signal when the current error signal is greater than the voltage error signal and the external error signal.

14. The power stage of claim 5 wherein the converter provides a current sense signal, the control circuit further comprising,
- a current error amplifier for providing a current error signal scaled to the difference between the current sense signal and a current reference,
- a current error diode for communicating the current error signal onto the voltage control line, the current error diode is for translating the current error signal into the voltage control signal for controlling the transformer switching signal, the voltage control signal is controlled by the voltage error signal, the current error signal or the external error signal, and
- a blocking diode for blocking the voltage error signal and the external error signal from the control voltage signal when the current error signal is lesser than the voltage error signal and the external error signal.

15. A power stage for converting an input voltage to an output voltage coupled to a load receiving load current, the power stage comprising,
- a converter and a control circuit wherein the converter is for receiving the input voltage and providing an output voltage and the control circuit is for controlling the converter,
- the converter comprises:
  - a transformer having a primary winding for receiving the input voltage and conducting current in a first state and for disconnecting the transformer from the input voltage in a second state, and having a secondary winding for providing a switched power signal;
  - a switch for receiving a transformer switching signal and for switching the primary of the transformer between the first and second states for transforming the input voltage signal into the switched power signal; and
  - a rectifier circuit for rectifying the switched power signal into the output voltage;
  - a sensing resistor for providing a current sense signal scaled to the load current; and
  - a current sensor for sensing the current in the primary winding and providing a switched current signal, and the control circuit comprises:
- a voltage error amplifier for providing a voltage error signal scaled to the difference between the output voltage and a voltage reference,
- a voltage error diode for communicating the voltage error signal onto a shared-bus control line, the shared-bus control line for receiving an external error signal, the voltage error diode is for translating the voltage error signal into a voltage control signal for controlling the transformer switching signal;
- a current error amplifier for providing a current error signal scaled to the difference between the current sense signal and a current reference;
- a current error diode for communicating the current error signal onto the voltage control line, the current error diode is for translating the current error signal into the voltage control signal for controlling the transformer switching signal, the voltage control signal is controlled by the voltage error signal when greater than the current error signal and the external error signal, controlled by the external error signal when greater than the voltage error signal and the current error signal, or controlled by the current error signal when greater than the voltage error signal and the external error signal;
- a blocking diode for blocking the voltage error signal and the external error signal from the control voltage signal when the current error signal is greater than the voltage error signal and the external error signal; and
- a driver for receiving the voltage control signal and the switched current signal for generating transformer switching signal for alternating driving the switch being in the first and second states for switching the primary of the transformer to generate the switched power signal.

16. The power stage of claim 15 wherein,
the voltage error diode has a cathode connected to the voltage error amplifier and has an anode connected to the shared-bus and to the blocking diode,
the blocking diode has a cathode connected to the shared-bus and the voltage error diode and has an anode connected to the current error diode,
the current error diode has a cathode connected to the current error amplifier and has an anode connected to the blocking diode,
the voltage error amplifier has a negative input connected to the output voltage and has a positive input connected to the voltage reference,
the current error amplifier has a negative input connected to the current sense signal and has a positive input connected to the current reference, and
the voltage control signal is controlled by the voltage error signal, or the current error signal, or the external error signal whichever one is lesser.

17. The power stage of claim 15 wherein,
the voltage error diode has an anode connected to the voltage error amplifier and has a cathode connected to the shared-bus and to the blocking diode,
the blocking diode has an anode connected to the shared-bus and the voltage error diode and has a cathode connected to the current error diode,
the current error diode has an anode connected to the current error amplifier and has a cathode connected to the blocking diode, the voltage error amplifier has a positive input connected to the output voltage and has a negative input connected to the voltage reference, the current error amplifier has a positive input connected to the current sense signal and has a negative input connected to the current reference, and the voltage control signal is controlled by the voltage error signal, or the current error signal, or the external error signal whichever one is greater.

18. The power stage of claim 15 wherein, the voltage error diode has an anode connected to the voltage error amplifier and has a cathode connected to the shared-bus and to the blocking diode, the blocking diode has an anode connected to the shared-bus and the voltage error diode and has a cathode connected to the current error diode, the current error diode has an anode connected to the current error amplifier and has a cathode connected to the blocking diode, the voltage error amplifier has a positive input connected to the output voltage and has a negative input connected to the voltage reference, the current error amplifier has a positive input connected to the current sense signal and has a negative input connected to the current reference, and the voltage control signal is an algebraic difference between an offset reference and an error signal at the cathode of the blocking diode, and is controlled by the voltage error signal, or the current error signal, or the external error signal whichever one is greater.

19. A power system for supplying power to load, the power system comprises a plurality of parallel connected power stages, each of the plurality of power stages is for converting an input voltage to an output voltage coupled to a load, each of the plurality of power stages comprises a converter and a control circuit wherein the converter is for receiving the input voltage and providing the output voltage and the control circuit is for controlling the converter, the converter comprises:

a transformer having a primary winding for receiving the input voltage and conducting current in a first state and for disconnecting the transformer from the input voltage in a second state, and having a secondary winding for providing a switched power signal;

a switch for receiving a transformer switching signal and for switching the primary of the transformer between the first and second states for transforming the input voltage signal into the switched power signal; and a rectifier circuit for rectifying the switched power signal into the output voltage, and the control circuit comprises:

a voltage error amplifier for providing a voltage error signal scaled to the difference between the output voltage and a voltage reference;

a voltage error diode for communicating the voltage error signal onto a shared-bus control line, the shared-bus control line for receiving an external error signal from the remaining converters of the plurality of power stages, the voltage error diode is for translating the voltage error signal into a voltage control signal for controlling the transformer switching signal, the voltage control signal is controlled by the voltage error signal or controlled by the external error signal; and a driver for receiving the voltage control signal for generating the transformer switching signal for alternating driving the switch between the first and second state for switching the primary of the transformer to generate the switched power signal.

20. The power system of claim 19 wherein each of the converters of the plurality of power stages provides a current sense signal, each of the control circuits further comprises, a current error amplifier for providing a current error signal scaled to the difference between the current sense signal and a current reference, and a current error diode for communicating the current error signal onto the voltage control line, the current error diode is for translating the current error signal into the voltage control signal for controlling the transformer switching signal, the voltage control signal is controlled by the voltage error signal, the external error signal or the current error signal.

* * * * *